(12) United States Patent
Huseth et al.

(10) Patent No.: US 8,756,007 B2
(45) Date of Patent: Jun. 17, 2014

(54) PROVIDING A LOCATION OF AN INDIVIDUAL

(75) Inventors: Steve Huseth, Morristown, NJ (US); Tom Plocher, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 658 days.

(21) Appl. No.: 13/016,405

(22) Filed: Jan. 28, 2011

(65) Prior Publication Data

US 2012/0197518 A1 Aug. 2, 2012

(51) Int. Cl.
*G01C 21/00* (2006.01)
*G01C 21/20* (2006.01)
*G01C 21/30* (2006.01)

(52) U.S. Cl.
USPC .......... 701/447; 701/32.3; 701/434; 701/438; 701/445; 701/446; 701/451; 701/455

(58) Field of Classification Search
CPC ...... G01C 21/00; G01C 21/20; G01C 21/206; G01C 21/30; G01C 21/303; G01C 21/34; G01C 21/3415; G01C 21/3492; G01C 21/3691
USPC ......... 701/32.3, 434, 438, 445–447, 451, 455
See application file for complete search history.

(56) References Cited

U.S. PATENT DOCUMENTS

| | | | |
|---|---|---|---|
| 5,848,373 A * | 12/1998 | DeLorme et al. | 701/455 |
| 7,333,052 B2 | 2/2008 | Maskell | |
| 7,349,802 B2 * | 3/2008 | Lee et al. | 701/446 |
| 7,499,571 B1 | 3/2009 | Han et al. | |
| 7,574,019 B2 | 8/2009 | Mittal et al. | |
| 7,783,076 B2 | 8/2010 | Tsunashima | |
| 7,792,641 B2 | 9/2010 | Liu et al. | |
| 7,809,661 B2 | 10/2010 | D'Ambrosio | |
| 8,396,659 B2 * | 3/2013 | Ando et al. | 701/446 |
| 2005/0021229 A1 * | 1/2005 | Lee et al. | 701/210 |
| 2007/0010940 A1 * | 1/2007 | Tan et al. | 701/207 |
| 2008/0004804 A1 * | 1/2008 | Fujita et al. | 701/210 |
| 2008/0077326 A1 * | 3/2008 | Funk et al. | 701/220 |
| 2009/0043504 A1 * | 2/2009 | Bandyopadhyay et al. | 701/213 |
| 2009/0110236 A1 | 4/2009 | Huang et al. | |
| 2009/0177385 A1 * | 7/2009 | Matas et al. | 701/209 |
| 2009/0267921 A1 * | 10/2009 | Pryor | 345/177 |
| 2010/0217522 A1 * | 8/2010 | Ando et al. | 701/208 |
| 2010/0250481 A1 | 9/2010 | Tomastik | |
| 2010/0312461 A1 * | 12/2010 | Haynie et al. | 701/117 |
| 2012/0197518 A1 * | 8/2012 | Huseth et al. | 701/300 |

OTHER PUBLICATIONS

EP Search Report for related EP Application 12152553.9, mailed May 24, 2012 (3 pages).
"Statement in Accordance with the Notice from the European Patent Office Dated Oct. 1, 2007 Concerning Business Methods (OJ EPO Nov. 2007. 592-593)" (1 page).

(Continued)

*Primary Examiner* — Mary Cheung
*Assistant Examiner* — Atul Trivedi
(74) *Attorney, Agent, or Firm* — Brooks, Cameron & Huebsch, PLLC

(57) ABSTRACT

Methods, devices, and systems for providing a location of an individual are described herein. One or more device embodiments include a memory, and a processor coupled to the memory. The processor is configured to execute executable instructions stored in the memory to concurrently provide a location of an individual at least two different points in time, a time identifier for each of the at least two different points in time, and an uncertainty associated with the location of the individual at each of the at least two different points in time to a user.

20 Claims, 2 Drawing Sheets

(56) References Cited

OTHER PUBLICATIONS

Yunpeng Liu, et al., Covariance Tracking via Geometric Particle Filtering, EURASIP Journal on Advances in Signal Processing, vol. 2010, Article ID 583918 (9 pgs.).

Ming Wu, et al., Moving Object Detecting and Tracking with Mobile Robot Based on Extended Kalman Filter in Unknown Environment, 2010 International Conference on Machine Vision and Human-machine Interface, Apr. 24-25, 2010 (4 pgs.).

* cited by examiner

PROVIDING A LOCATION OF AN INDIVIDUAL

TECHNICAL FIELD

The present disclosure relates to methods, devices, and systems for providing a location of an individual.

BACKGROUND

A number of methods, devices, and/or systems can be used to provide the location of an individual, such as, for example, firefighters, police officers, military personnel, and/or factory employees, among other types of individuals. However, such methods, devices, and/or systems may be inherently imprecise. That is, the provided location of the individual may contain some residual uncertainty (e.g., error) when compared to the actual location of the individual.

If the location of the individual is provided to a user without the uncertainty associated with the provided location, the user may not have an accurate idea of the actual location of the individual (e.g., the user may not accurately know where the individual may actually be). This can be problematic and/or dangerous in situations in which an accurate idea of the actual location of the individual may be needed, such as firefighter, police, and/or military operations, and/or factory evacuations, for example, among other types of situations.

Accordingly, the uncertainty associated with the provided location of the individual may be provided to the user in addition to the individual's location. However, if the uncertainty is not provided to the user in a manner that is easily understandable, the user may not be able to interpret the uncertainty correctly and may become confused about where the individual may actually be. That is, even though the uncertainty associated with the provided location of the individual may be provided to the user, the user may still not have an accurate idea of the actual location of the individual.

As an example, the average uncertainty associated with the location of the individual may be provided to the user. However, in actuality, the uncertainty associated with the location of the individual may not remain static. For example, the uncertainty associated with the location of the individual may change as the location of the individual changes. For instance, a first location of the individual having a small uncertainty associated therewith may be followed by a second location having a larger uncertainty associated therewith. Accordingly, if the average uncertainty is provided to the user, the user may not have an accurate idea of the actual location of the individual.

Further, the location history of the individual (e.g., previous locations of the individual and/or the uncertainty associated with the previous locations of the individual) may not be provided to the user. That is, only the current location of the individual and/or the uncertainty associated with the current location of the individual may be provided to the user. However, in some instances (e.g., firefighter, police, and/or military operations, and/or factory evacuations), the location history of the individual may provide the user with a more accurate idea of the actual location of the individual than the current location and/or current uncertainty, particularly if the current uncertainty is larger than the previous uncertainties. Accordingly, if the location history of the individual is not provided to the user concurrently with the current location and/or uncertainty associated with the current location of the individual, the user may not have an accurate idea of the actual location of the individual.

DETAILED DESCRIPTION

Methods, devices, and systems for providing a location of an individual are described herein. One or more device embodiments include a memory, and a processor coupled to the memory. The processor is configured to execute executable instructions stored in the memory to concurrently provide a location of an individual at least two different points in time, a time identifier for each of the at least two different points in time, and an uncertainty associated with the location of the individual at each of the at least two different points in time to a user.

One or more embodiments of the present disclosure may provide a user with an accurate idea of the actual location of an individual. For instance, one or more embodiments of the present disclosure may provide a more accurate idea of the actual location of an individual than previous approaches.

For example, one or more embodiments of the present disclosure may provide the location history of the individual (e.g., previous locations of the individual and/or the uncertainty associated with the previous locations of the individual) to the user. In contrast, previous approaches may not provide the location history of the individual to the user.

As an additional example, one or more embodiments of the present disclosure may provide the uncertainty associated with the location of the individual to the user as a number of standard deviations of error associated with the location of the individual. In contrast, previous approaches may provide the uncertainty associated with the location of the individual to the user as an average uncertainty associated with the location of the individual.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of locations" can refer to one or more locations.

Figure 1:
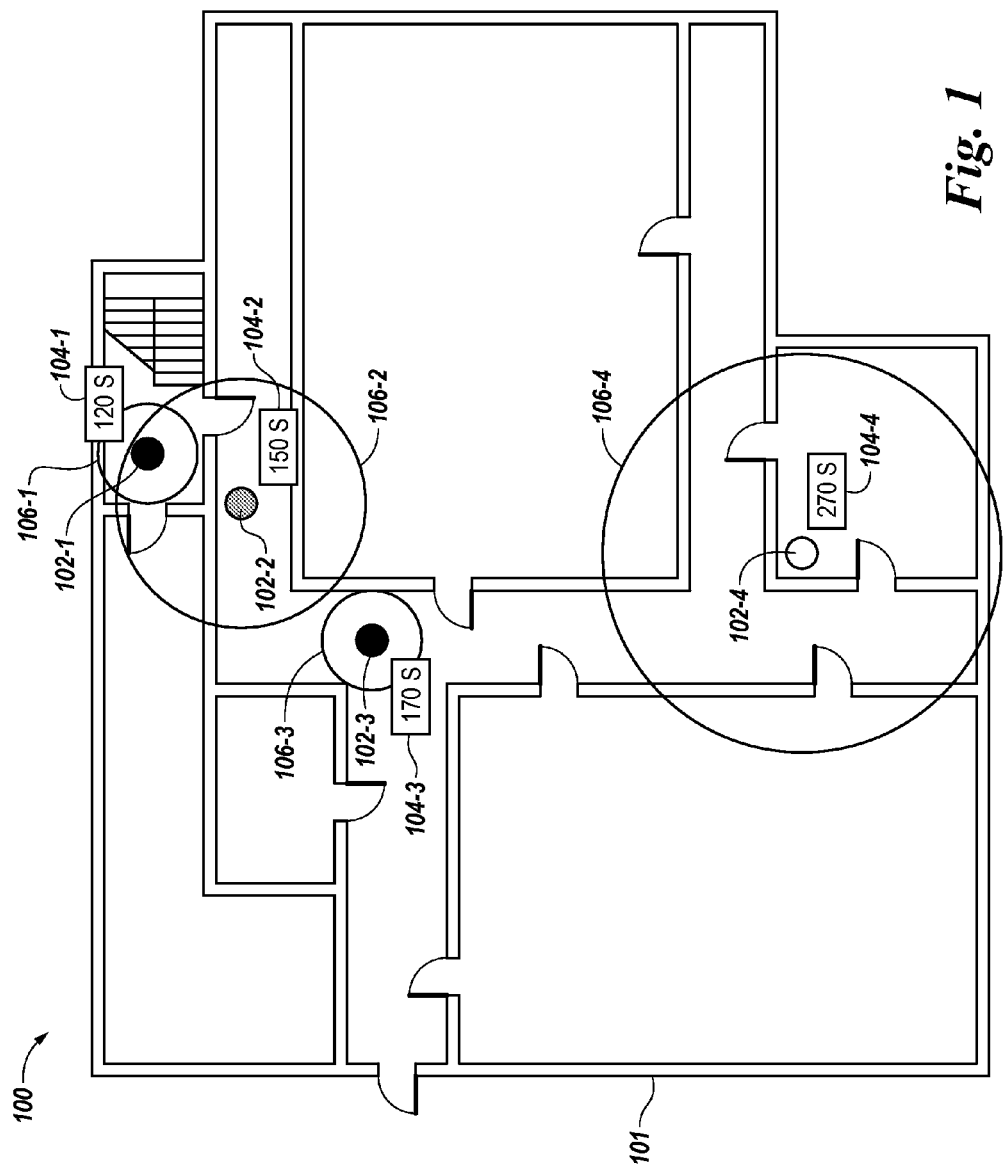
FIG. 1 illustrates a display for providing a location of an individual in accordance with one or more embodiments of the present disclosure.

FIG. 1 illustrates a display 100 for providing a location of an individual in accordance with one or more embodiments of the present disclosure. For example, display 100 can concurrently provide (e.g., concurrently display and/or present) the location of the individual at a number of different points in time, a time identifier for each of the number of different points in time, and/or an uncertainty associated with the location of the individual at each of the number of different points in time, as will be further described herein. The location of the individual at each of the number of different points in time can be received, for example, from a device on the person of the individual, as will be further described herein.

The individual can be, for example, a firefighter, a police officer, a military member, or a factory employee, among other types of individuals. However, embodiments of the present disclosure are not limited to a particular type of individual.

Display 100 (e.g., the location of the individual at the number of different points in time, the time identifier for each of the number of different points in time, and/or the uncertainty associated with the location of the individual at each of the number of different points in time) can be provided to a user (not shown in FIG. 1). For example, display 100 can be displayed to the user on a user interface of a computing device of the user (e.g., user interface 246 of computing device 210 described in connection with FIG. 2), as will be further described herein. The user can be, for example, a fire department commander, a police commander, a military commander, or a factory supervisor, among other types of users. However, embodiments of the present disclosure are not limited to a particular type of user.

As shown in FIG. 1, display 100 includes a topology 101 of an area in which the individual is located. The location of the individual in topology 101 at each of the number of different points in time can be provided to the user, e.g., displayed in topology 101. In the embodiment illustrated in FIG. 1, topology 101 is a floor plan of a building. However, embodiments of the present disclosure are not limited to a particular type of topology. In some embodiments, the user may have prior knowledge of topology 101 and/or topology 101 may be stored on the computing device of the user.

In the embodiment illustrated in FIG. 1, a location 102-1 of the individual at a first point in time (e.g., 120 seconds, a location 102-2 of the individual at a second point in time (e.g., 150 seconds) that is after the first point in time, a location 102-3 of the individual at a third point in time (e.g., 170 seconds) that is after the second point in time, and a location 102-4 of the individual at a fourth point in time (e.g., 270 seconds) that is after the third point in time are concurrently provided in display 100. That is, the location history of the individual is provided in display 100. Because the location history of the individual is provided in display 100, the user may have a more accurate idea of the actual location of the individual than with previous approaches, as previously described herein.

The location 102-1, 102-2, 102-3, and 102-4 of the individual at each different point in time can be received, for example, from a device (e.g., a navigational device) on the person of the individual, such as, for instance, a device that is part of a Geospatial Location Accountability and Navigation System for Emergency Responders (GLANSER). For instance, the location of the individual at each different point in time can be received from an inertial sensor on the person of the individual. The inertial sensor can include, for example, a gyroscope and an accelerometer which can determine the location of the individual based on a known starting point. The location of the individual at each different point in time can also be received from a radio signal from a radio transmitter on the person of the individual, and/or from a Global Positioning System (GPS) device on the person of the individual. However, embodiments of the present disclosure are not limited to a particular type of device or a particular method of receiving the location of the individual.

Although the embodiment illustrated in FIG. 1 includes the location of the individual at four different points in time, embodiments of the present disclosure are not limited to a particular number of points in time. That is, the location of the individual at any number of different points in time can be concurrently provided in display 100.

A time identifier (e.g., 104-1, 104-2, 104-3, and 104-4) for each different point in time can also be concurrently provided in display 100, as illustrated in FIG. 1. In the embodiment illustrated in FIG. 1, each time identifier for each different point in time is displayed adjacent to the location of the individual at that particular point in time (e.g., the time identifier 104-1 for the first point in time is displayed adjacent to location 102-1, the time identifier 104-2 for the second point in time is displayed adjacent to location 102-2, etc.). However, embodiments of the present disclosure are not so limited.

Each time identifier 104-1, 104-2, 104-3, and 104-4 for each different point in time can include, for example, a different amount of time elapsed since an initial point in time (e.g., since a starting time). That is, each different point in time can be, for example, a different amount of time elapsed since an initial point in time. For instance, in the embodiment illustrated in FIG. 1, the time identifier 104-1 for the first point in time includes 120 seconds since an initial point in time (e.g., the first point in time is 120 seconds since the initial point in time), the time identifier 104-2 for the second point in time includes 150 seconds since the initial point in time, the time identifier 104-3 for the third point in time third point in time includes 170 seconds since the initial point in time, and the time identifier 104-4 for the fourth point in time includes 270 seconds since the initial point in time. The initial point in time can be, for example, a point in time at which an uncertainty associated with a location of the individual is equal to or less than a pre-defined uncertainty threshold. The uncertainty associated with the location of the individual can be, for example, the number of standard deviations of error associated with the location of the individual, and the pre-defined uncertainty threshold can be, for example, a particular number of standard deviations of error, such as, for instance, one or two standard deviations of error. The initial point in time can also be, for example, the point at which the individual enters the area of topology 101.

Although not illustrated in FIG. 1, in some embodiments the initial point in time can be the first point in time. In such embodiments, the time identifier 104-1 for the first point in time would include zero (e.g., the first point in time would be zero), and the time identifiers 104-2, 104-3, and 104-4 for the second, third, and fourth points in time would include the different amounts of time elapsed since the first point in time (e.g., 30 seconds, 50 seconds, and 150 seconds, respectively).

In the embodiment illustrated in FIG. 1, the location 102-1, 102-2, 102-3, and 102-4 of the individual at each different point in time is represented as different dots. For example, the location 102-1 of the individual at the first point in time is represented as a first dot, the location 102-2 of the individual at the second point in time is represented as a second dot, etc., as shown in FIG. 1. However, embodiments of the present disclosure are not limited to a particular type of location representation.

As shown in FIG. 1, an uncertainty 106-1, 106-2, 106-3, and 106-4 associated with the location 102-1, 102-2, 102-3, and 102-4 of the individual at each different point in time can also be concurrently provided with the location 102-1, 102-2, 102-3, and 102-4 of the individual at each different point in time and the time identifier 104-1, 104-2, 104-3, and 104-4 for each different point in time in display 100. The uncertainty can correspond to the residual error inherent in the location of the individual received from the device on the person of the individual, as compared to the actual location of the individual, at each different point in time (e.g., the individual may not actually be located exactly at the location received from the device). That is, the uncertainty can correspond to an area around the received location in which the individual may actually be located. Because the uncertainty associated with the location of the individual at each different point in time can be provided in display 100, the user may have a more accurate idea of the actual location of the individual than with previous approaches, as previously described herein.

As shown in FIG. 1, the uncertainty associated with the location of the individual may not remain static. That is, the uncertainty associated with the location of the individual may change as the location of the individual changes, as illustrated in FIG. 1 and further described herein. This change in the uncertainty can result from, for example, the capabilities and/or parameters of the device from which the location of the individual is received, and/or the data sensed by the device, among other factors.

In some embodiments, the uncertainty 106-1, 106-2, 106-3, and 106-4 associated with the location 102-1, 102-2, 102-3, and 102-4 of the individual at each different point in time can be, for example, the number of standard deviations of error associated with the location of the individual at each different point in time. For example, the uncertainty 106-1 associated with the location 102-1 of the individual at the first point in time can be the number of standard deviations of error associated with the location 102-1 of the individual at the first point in time, the uncertainty 106-2 associated with the location 102-2 of the individual at the second point in time can be the number of standard deviations of error associated with the location 102-2 of the individual at the second point in time, etc. Because the uncertainty associated with the location of the individual at each different point in time can be the number of standard deviations of error associated with the location of the individual at each different point in time, the user may have a more accurate idea of the actual location of the individual than with previous approaches, as previously described herein.

In the embodiment illustrated in FIG. 1, the uncertainty 106-1, 106-2, 106-3, and 106-4 associated with the location 102-1, 102-2, 102-3, and 102-4 of the individual at each different point in time is represented as a circle around the different dots representing the location of the individual at each different point in time. For example, the uncertainty 106-1 associated with the location 102-1 of the individual at the first point in time is represented as a circle around the first dot, the uncertainty 106-2 associated with the location 102-2 of the individual at the second point in time is represented as a circle around the second dot, etc., as shown in FIG. 1. The area within each circle can correspond to the area in which the individual may actually be located at each different point in time. For example, in the embodiment illustrated in FIG. 1, the individual may actually be located anywhere within the circle around the first dot at the first point in time, the individual may actually be located anywhere within the circle around the second dot at the second point in time, etc.

In some embodiments, the sizes of the circles around the different dots can represent the amount of uncertainty associated with the location of the individual at each different point in time. For example, the greater the amount of uncertainty associated with a location of an individual at a point in time, the greater the size of the circle around the dot representing the location of the individual at that point in time. For instance, in the embodiment illustrated in FIG. 1, locations 102-1 and 102-3 have the same amount of uncertainty associated therewith (e.g., one standard deviation of error), location 102-2 has a different (e.g., greater) amount of uncertainty associated therewith than locations 102-1 and 102-3 (e.g., two standard deviations of error), and location 102-4 has a different (e.g., greater) amount of uncertainty associated therewith than locations 102-1, 102-2, and 102-3 (e.g., three standard deviations of error).

In the embodiment illustrated in FIG. 1, the uncertainty associated with the location 102-1, 102-2, 102-3, and 102-4 of the individual at each different point in time is also represented as a color and/or shading of the different dots representing the location 102-1, 102-2, 102-3, 102-4 of the individual at each different point in time. For example, the uncertainty associated with the location 102-1 of the individual at the first point in time is represented as a color and/or shading of the first dot, the uncertainty associated with the location 102-2 of the individual at the second point in time is represented as a color and/or shading of the second dot, etc., as shown in FIG. 1.

In some embodiments, the colors and/or shadings of the different dots can represent the amount of uncertainty associated with the location of the individual at each different point in time. For example, the greater the amount of uncertainty associated with a location of an individual at a point in time, the darker the color and/or shading of the dot representing the location of the individual at that point in time. For instance, in the embodiment illustrated in FIG. 1, locations 102-1 and 102-3 have the same amount uncertainty associated therewith (e.g., one standard deviation of error), and locations 102-2 and 102-4 have different amounts of uncertainty associated therewith (e.g., two and three standard deviations of error, respectively), as previously described herein.

Although the embodiment illustrated in FIG. 1 includes two different ways of representing the uncertainty associated with the location of the individual at each different point in time, embodiments of the present disclosure are not limited to a particular way of representing the uncertainty or to a particular number of ways of representing the uncertainty. Further, in some embodiments, the user can select the manner(s) in which the uncertainty associated is represented and/or displayed.

Additionally, in some embodiments, the colors and/or shadings of the different dots can represent the time identifier for each different point in time. That is, the color and/or shading of a dot can represent the time relative to the location of the individual represented by that dot. For example, the color and/or shading of a dot can represent an amount of time elapsed since the individual was at the location represented by that dot (e.g., how far in the past the individual was at the location represented by that dot).

In the embodiment illustrated in FIG. 1, the location 102-1, 102-2, 102-3, and 102-4 of the individual at each different point in time, the time identifier 104-1, 104-2, 104-3, and 104-4 for each different point in time, and the uncertainty 106-1, 106-2, 106-3, and 106-4 associated with the location 102-1, 102-2, 102-3, and 102-4 of the individual at each different point in time are all concurrently provided in display 100, regardless of the uncertainty associated with the location of the individual at each different point in time. That is, any and/or all locations of the individual at a number of different points in time, the time identifier for each different point in time, and/or an uncertainty associated with the location of the individual at each different point in time can be concurrently provided to the user, regardless of the uncertainty associated with the location of the individual at each different point in time. However, embodiments of the present disclosure are not so limited.

For instance, in some embodiments, the location of the individual at a point in time, the time identifier for the point in time, and/or the uncertainty associated with the location of the individual at the point in time may be provided only if the uncertainty associated with the location of the individual at the point in time is equal to or less than a pre-defined uncertainty threshold. The pre-defined uncertainty threshold can be, for example, a particular number of standard deviations of error, such as, for instance, one or two standard deviations of error. As an example, in some embodiments the pre-defined uncertainty threshold can be one standard deviation of error. In such an example, only the location 102-1 and 102-3 of the individual at the first and third points in time, the time identifier 104-1 and 104-3 for the first and third points in time, and/or the uncertainty 106-1 and 106-3 associated with the location 102-1 and 102-3 of the individual at the first and third points in time, would be provided in display 100. That is, in such an example, the location 102-2 and 102-4 of the individual at the second and fourth points in time, the time identifier 104-2 and 104-4 for the second and fourth points in time, and/or the uncertainty 106-2 and 106-4 associated with the location 102-2 and 102-4 of the individual at the second and fourth points in time, would not be provided in display 100.

Additionally, in some embodiments, the location of the individual at a particular point in time, the time identifier for the particular point in time, and/or the uncertainty associated with the location of the individual at the particular point in time may no longer be provided if an uncertainty associated with the location of the individual at a subsequent point in time (e.g., a point in time after the particular point in time) is equal to or less than the uncertainty associated with the location of the individual at the particular point in time. As an example, in such embodiments, the location 102-1 and 102-2 of the individual at the first and second points in time, the time identifier for the first and second points in time, and/or the uncertainty 106-1 and 106-2 associated with the location 102-1 and 102-2 of the individual at the first and second points in time would no longer be provided in display 100 once the location 102-3 of the individual at the third point in time, the time identifier 104-3 for the third point in time, and/or the uncertainty 106-3 associated with the location 102-3 of the individual at the third point in time is provided in display 100.

Additionally, in some embodiments, the location of the individual at a particular point in time, the time identifier for the particular point in time, and/or the uncertainty associated with the location of the individual at the particular point in time may be provided if the uncertainty associated with the location of the individual at the particular point in time is equal to or less than a pre-defined uncertainty threshold and an uncertainty associated with the location of the individual at a subsequent point in time. The pre-defined uncertainty threshold can be, for example, a particular number of standard deviations of error, such as, for instance, one or two standard deviations of error. As in example, in some embodiments the pre-defined uncertainty threshold can be one standard deviation of error. In such an example, the location 102-1 of the individual at the first point in time, the time identifier for the first point in time, and/or the uncertainty 106-1 associated with the location 102-1 of the individual at the first point in time would be provided in display 100. However, the location 102-2 of the individual at the second point in time, the time identifier for the second point in time, and/or the uncertainty 106-2 associated with the location 102-2 of the individual at the second point in time would not be provided in display 100.

Although not illustrated in FIG. 1, in some embodiments the location of the individual at each different point in time can be represented as a continuous location stream, such as, for instance, a ribbon, that can display the path the individual is on. For example, in such embodiments, the location 102-1, 102-2, 102-3, and 102-4 of the individual at each different point in time would be represented as a continuous location stream (e.g., path) that can include (e.g., connect) each location 102-1, 102-2, 102-3, and 102-4. Additionally, the uncertainty associated with the location of the individual at each different point in time can be represented as a thickness of the stream. For example, the greater the amount of uncertainty associated with a location of the individual at a point in time, the greater the thickness of the stream at that location.

Figure 2:
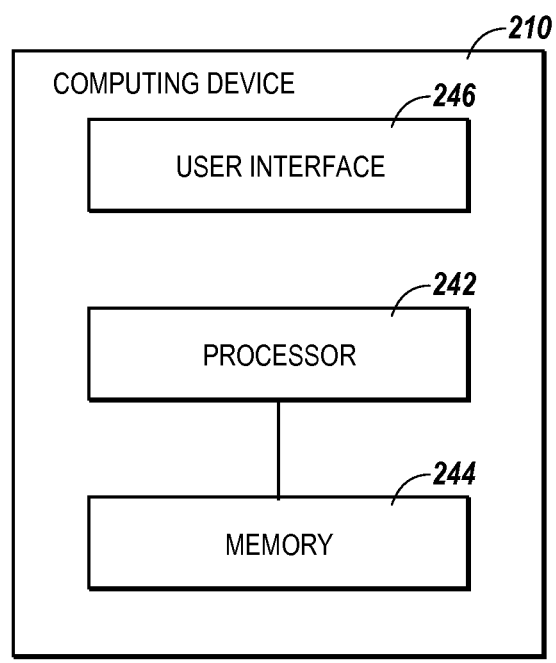
FIG. 2 illustrates a block diagram of a computing device for providing a location of an individual in accordance with one or more embodiments of the present disclosure.

FIG. 2 illustrates a block diagram of a computing device 210 for providing a location of an individual in accordance with one or more embodiments of the present disclosure. The individual can be, for example, the individual previously described herein (e.g., in connection with FIG. 1).

As shown in FIG. 2, computing device 210 includes a processor 242 and a memory 244 coupled to processor 242. Memory 244 can be volatile or nonvolatile memory. Memory 244 can also be removable, e.g., portable memory, or non-removable, e.g., internal memory. For example, memory 244 can be random access memory (RAM), read-only memory (ROM), dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 244 is illustrated as being located in computing device 240, embodiments of the present disclosure are not so limited. For example, memory 244 can also be located internal to another computing resource, e.g., enabling computer readable instructions to be downloaded over the Internet or another wired or wireless connection.

Memory 244 can store executable instructions, such as, for example, computer readable instructions (e.g., software), for providing a location of an individual in accordance with one or more embodiments of the present disclosure. Processor 242 can execute the executable instructions stored in memory 244 to provide a location of an individual in accordance with one or more embodiments of the present disclosure.

As shown in FIG. 2, computing device 210 also includes a user interface 246. User interface 246 can include, for example, a screen that can provide (e.g., display and/or present) information to a user of computing device 210. However, embodiments of the present disclosure are not limited to a particular type of user interface.

User interface 246 can provide a location of an individual to a user of computing device 210 in accordance with one or more embodiments of the present disclosure. For example, display 100 previously described in connection with FIG. 1 can be displayed to the user on user interface 246. The user can be, for example, the user previously described herein (e.g., in connection with FIG. 1).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for providing a location of an individual, comprising:
   a memory; and
   a processor coupled to the memory, wherein the processor is configured to execute executable instructions stored in the memory to:
      concurrently provide in a same display a location of an individual at at least two different points in time, a time identifier for each of the at least two different points in time, and an uncertainty associated with the location of the individual at each of the at least two different points in time to a user.

2. The computing device of claim 1, wherein the processor is configured to execute executable instructions stored in the memory to concurrently display in the same display the location of the individual at the at least two different points in time, the time identifier for each of the at least two different points in time, and the uncertainty associated with the location of the individual at each of the at least two different points in time on a user interface of the computing device.

3. The computing device of claim 2, wherein the processor is configured to execute executable instructions stored in the memory to:
   display a topology of a building in which the individual is located on the user interface; and
   concurrently display in the same display the location of the individual in the building at the at least two different points in time, the time identifier for each of the at least two different points in time, and the uncertainty associated with the location of the individual in the building at each of the at least two different points in time in the displayed topology.

4. The computing device of claim 1, wherein each time identifier for each of the at least two different points in time provided to the user includes a different amount of time elapsed since an initial point in time.

5. The computing device of claim 4, wherein the initial point in time is a point in time at which an uncertainty associated with a location of the individual is equal to or less than a pre-defined uncertainty threshold.

6. The computing device of claim 1, wherein the processor is configured to execute executable instructions stored in the memory to provide the location of the individual at the at least two different points in time, the time identifier for each of the at least two different points in time, and the uncertainty associated with the location of the individual at each of the at least two different points in time only if the uncertainty associated with the location of the individual at each of the at least two different points in time is equal to or less than a pre-defined uncertainty threshold.

7. The computing device of claim 1, wherein the processor is configured to execute executable instructions stored in the memory to provide the location of the individual at the at least two different points in time, the time identifier for each of the at least two different points in time, and the uncertainty associated with the location of the individual at each of the at least two different points in time regardless of the uncertainty associated with the location of the individual at each of the at least two different points in time.

8. The computing device of claim 1, wherein the processor is configured to execute executable instructions stored in the memory to:
   represent the location of the individual at the at least two different points in time as a continuous location stream; and
   represent the uncertainty associated with the location of the individual at each of the at least two different points in time as a thickness of the continuous location stream.

9. A method for providing a location of an individual, comprising:
   receiving a location of an individual at a first point in time;
   providing in a display the location of the individual at the first point in time and a time identifier for the first point in time to a user;
   receiving a location of the individual at a second point in time that is after the first point in time; and
   providing in the display the location of the individual at the second point in time and a time identifier for the second point in time to the user while providing in the display the location of the individual at the first point in time and the time identifier for the first point in time to the user.

10. The method of claim 9, wherein the method includes:
    providing in the display an uncertainty associated with the location of the individual at the first point in time to the user; and
    providing in the display an uncertainty associated with the location of the individual at the second point in time to the user while providing in the display the uncertainty associated with the location of the individual at the first point in time to the user.

11. The method of claim 9, wherein the method includes:
    receiving a location of the individual at a third point in time that is after the second point in time; and
    providing in the display the location of the individual at the third point in time and a time identifier for the third point in time to the user while providing in the display the location of the individual at the first point in time, the time identifier for the first point in time, the location of the individual at the second point in time, and the time identifier for the second point in time to the user.

12. The method of claim 9, wherein the method includes:
    receiving a location of the individual at a third point in time that is after the second point in time; and
    providing in the display the location of the individual at the third point in time and a time identifier for the third point in time to the user while no longer providing in the display the location of the individual at the first point in time, the time identifier for the first point in time, the location of the individual at the second point in time, or the time identifier for the second point in time to the user if an uncertainty associated with the location of the individual at the third point in time is equal to or less than an uncertainty associated with the location of the individual at the first point in time and an uncertainty associated with the location of the individual at the second point in time.

13. The method of claim 9, wherein the method includes:
receiving the location of the individual at the first point in time from an inertial sensor on the person of the individual or from a radio signal from a radio transmitter on the person of the individual; and
receiving the location of the individual at the second point in time from the inertial sensor on the person of the individual or from a radio signal from the radio transmitter on the person of the individual.

14. A computing device for providing a location of an individual, comprising:
a memory; and
a processor coupled to the memory, wherein the processor is configured to execute executable instructions stored in the memory to:
provide in a display a location of an individual at a first point in time, a time identifier for the first point in time, and an uncertainty associated with the location of the individual at the first point in time to a user; and
provide in the display a location of the individual at a second point in time, a time identifier for the second point in time, and an uncertainty associated with the location of the individual at the second point in time to the user, wherein:
the second point in time is after the first point in time; and
the location of the individual at the first point in time, the time identifier for the first point in time, and the uncertainty associated with the location of the individual at the first point in time are provided in the display to the user while the location of the individual at the second point in time, the time identifier for the second point in time, and the uncertainty associated with the location of the individual at the second point in time are provided in the display to the user.

15. The computing device of claim 14, wherein the processor is configured to execute executable instructions stored in the memory to:
represent the location of the individual at the first point in time as a first dot; and
represent the location of the individual at the second point in time as a second dot.

16. The computing device of claim 15, wherein the processor is configured to execute executable instructions stored in the memory to:
represent the uncertainty associated with the location of the individual at the first point in time or the time identifier for the first point in time as a color or shading of the first dot; and
represent the uncertainty associated with the location of the individual at the second point in time or the time identifier for the second point in time as a color or shading of the second dot.

17. The computing device of claim 15, wherein the processor is configured to execute executable instructions stored in the memory to:
represent the uncertainty associated with the location of the individual at the first point in time as a circle around the first dot, wherein:
a size of the circle around the first dot represents an amount of uncertainty associated with the location of the individual at the first point in time; and
the greater the amount of uncertainty associated with the location of the individual at the first point in time, the greater the size of the circle around the first dot; and
represent the uncertainty associated with the location of the individual at the second point in time as a circle around the second dot, wherein:
a size of the circle around the second dot represents an amount of uncertainty associated with the location of the individual at the second point in time; and
the greater the amount of uncertainty associated with the location of the individual at the second point in time, the greater the size of the circle around the second dot.

18. The computing device of claim 14, wherein the uncertainty associated with the location of the individual at the second point in time is different than the uncertainty associated with the location of the individual at the first point in time.

19. The computing device of claim 14, wherein:
the uncertainty associated with the location of the individual at the first point in time is a number of standard deviations of error associated with the location of the individual at the first point in time; and
the uncertainty associated with the location of the individual at the second point in time is a number of standard deviations of error associated with the location of the individual at the second point in time.

20. The computing device of claim 14, wherein the processor is configured to execute executable instructions stored in the memory to provide in the display the location of an individual at the first point in time, the time identifier for the first point in time, and the uncertainty associated with the location of the individual at the first point in time to the user if the uncertainty associated with the location of the individual at the first point in time is equal to or less than a pre-defined uncertainty threshold and the uncertainty associated with the location of the individual at the second point in time.

* * * * *